United States Patent Office
2,946,787
Patented July 26, 1960

2,946,787

17α - CARBOXYETHYL-6-HALO-17β-HYDROXYAN-DROST-4-EN-3-ONE LACTONES AND INTERMEDIATES

Roy H. Bible, Jr., Morton Grove, Ill., assignor to G. D. Searle & Co., Chicago, Ill., a corporation of Delaware No Drawing. Filed Aug. 7, 1959, Ser. No. 832,176

10 Claims. (Cl. 260—239.57)

This invention relates to 17α-carboxyethyl-6-halo-17β-hydroxyandrost-4-en-3-one lactones, processes for their manufacture, and intermediates whereby these processes proceed. More particularly, this invention relates to compounds of the formula

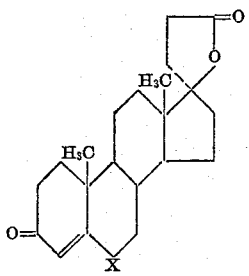

wherein X denotes replacement of one of the hydrogens on carbon atom 6 with halogen.

Equivalent to the foregoing lactones for purposes of this invention are the corresponding hydroxy acids and their alkali salts of the formula

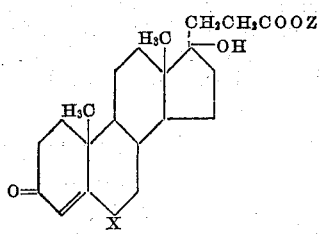

wherein X signifies a halogen atom as above and Z represents hydrogen, an alkali metal, or the ammonium radical. Those skilled in the art will appreciate that the described salts readily derive from the corresponding lactones on contact with aqueous alkali. The free acids, in turn, are obtained from the salts by a critically brief exposure to a proton source; prolongation of the exposure time induces lactonization.

The compounds of this invention are useful because of their valuable pharmacological properties. For example, they are potent diuretics, being adapted to block the effect of desoxycorticosterone acetate on urinary sodium and potassium. It follows that the intermediates from which these compounds can be obtained are also useful.

Manufacture of the subject compounds starts with 17α-(2-carboxyethyl)androst-5-ene-3β,17β-diol γ-lactone, an embodiment of the invention disclosed and claimed in United States Patent No. 2,705,712 to John A. Cella. This material is converted to the 5α,6α-epoxide with perbenzoic acid in benzene solution, and the corresponding halohydrin is formed therefrom by incorporation of the elements of the appropriate hydrohalide. The 3-alcohol function is then oxidized to a ketone with chromium trioxide in acid acetone medium, whereupon dehydration with hydrogen chloride in acetic acid or with thionyl chloride in pyridine affords the desired 6α and 6β epimers, respectively.

Alternatively, 17α-(2 - carboxyethyl) - 17β - hydroxyandrost-4-en-3-one lactone, another embodiment of the invention of John A. Cella disclosed in U.S. 2,705,712, is heated in carbon tetrachloride with the appropriate N-halosuccinimide to give the corresponding 6β-halo compound of this invention, which isomerizes to the 6α-epimer on contact with hydrogen halide in acetic acid.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1

A. *17α - (2 - carboxyethyl)-5α,6α-epoxyandrostane-3β, 17β-diol γ-lactone.*—A solution of approximately 44 parts of perbenzoic acid in 600 parts of benzene is added to a suspension of 99 parts of 17α-(2-carboxyethyl)-androst-5-ene-3β,17β-diol γ-lactone and 5 parts of anhydrous sodium acetate in 1400 parts of benzene. The resultant mixture is let stand at room temperatures for 1½ hours, whereupon it is washed with aqueous 5% sodium bicarbonate and then with water until the washings are neutral. The mixture is next dried over anhydrous sodium sulfate and finally stripped of solvent by distillation. The residue comprises a mixture of α and β epoxides which is separated by fractional crystallization from a mixture of acetone and petroleum ether. The α-epoxide, being less soluble than its epimer, is preferentially precipitated, leaving the β-epoxide in the mother liquors. The 17α-(2-carboxyethyl)-5α,6α-epoxyandrostane-3β,17β-diol γ-lactone thus obtained melts in the range 233.5–241.5° (with sublimation) and has a specific rotation of —96°.

B. *17α - (2 - carboxyethyl)-6β-fluoroandrostane-3β,5α, 17β-triol γ-lactone.*—To a solution of 87 parts of 17α-(2-carboxyethyl)-5α,6α-epoxyandrostane-3β,17β-diol γ-lactone in a mixture of 5500 parts of anhydrous benzene with 4300 parts of anhydrous ether is added 97 parts of boron fluoride ethyl ether. The resultant mixture is let stand at room temperatures for 4½ hours, whereupon a small amount of insoluble material is filtered out and the filtrate is stripped of solvent by distillation. The residue is 17α-(2-carboxyethyl)-6β-fluoroandrostane - 3β,5α,17β-triol γ-lactone.

C. *17α-(2-carboxyethyl)-6β-fluoro-5α,17β - dihydroxyandrostan-3-one γ-lactone.*—To a solution of 87 parts of 17α-(2-carboxyethyl)-6β-fluoroandrostane-3β,5α,17β-triol γ-lactone in 1040 parts of acetone is slowly added, with vigorous agitation at room temperatures, a solution of 12 parts of chromium trioxide and 18 parts of concentrated sulfuric acid in 45 parts of water. Sufficient 2-propanol is then introduced to destroy excess chromium trioxide, whereupon 5000 parts of water is added. The solid precipitate which forms is collected on a filter and washed thereon with water. Recrystallized from methanol, it melts at 225–229° (with decomposition). This material is 17α-(2-carboxyethyl)-6β-fluoro-5α,17β-dihydroxyandrostan-3-one γ-lactone.

D. *17α - (2 - carboxyethyl) - 6α - fluoro - 17β - hydroxyandrost-4-en-3-one lactone.*—Anhydrous hydrogen chloride is bubbled through a solution of 71 parts of 17α-(2 - carboxyethyl) -6β - fluoro - 5α,17β - dihydroxyandrostan-3-one γ-lactone in 5700 parts of glacial acetic acid at approximately 20° for 1½ hours. The resultant solution is let stand at room temperature for ½ hour, then poured into 40,000 parts of water. The mixture so produced is extracted with ether. The ether extract is washed successively with aqueous 5% sodium bicarbonate and water, whereupon it is dried over anhydrous calcium sulfate and then stripped of solvent by distillation. The residue, a yellow "glass," upon recrystallization from aqueous methanol (or aqueous acetone) affords a solvated material which melts with loss of solvent at about 100°, re-solidifies above this temperature, and melts again at 195°. Recrystallization of the solvated material from a mixture of acetone and petroleum ether affords an anhydrous product melting at 203–205° and characterized by a specific rotation of +72°. This product is 17α-(2-carboxyethyl) - 6α - fluoro - 17β - hydroxyandrost - 4 - en-3-one lactone, of the formula

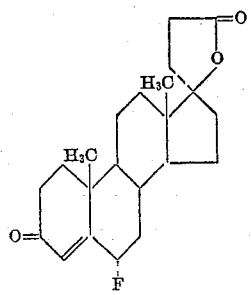

Example 2

17α - (2 - carboxyethyl) - 6β - fluoro - 17β - hydroxyandrost-4-en-3-one lactone.—To a solution of 8 parts of 17α - (2 - carboxyethyl) - 6β - fluoro - 5α,17β - dihydroxyandrostan-3-one γ-lactone in 80 parts of pyridine at approximately 5° is added 10 parts of thionyl chloride. The resultant mixture is stirred for 5 minutes, then diluted with 2000 parts of water. The mixture so produced is extracted with ether. The ether extract is washed with water, dried over anhydrous sodium sulfate, and stripped of solvent by distillation. The residue is 17α-(2-carboxyethyl)-6β-fluoro-17β-hydroxyandrost-4-en-3-one lactone, which is characterized by a maximum in the ultraviolet absorption spectrum at 234 millimicrons, with a molecular extinction coefficient of 12,500. The product has the formula

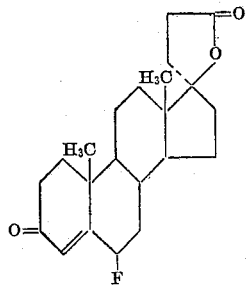

Example 3

A. 17α - (2 - carboxyethyl) - 6β - chloroandrostane-3β,5α,17β-triol γ-lactone.—To a solution of 9 parts of 17α - (2 - carboxyethyl) - 5α,6α - epoxyandrostane - 3β, 17β-diol γ-lactone in 670 parts of dichloromethane is added approximately 450 parts of concentrated hydrochloric acid. The resultant mixture is stirred for 20 minutes, then diluted with water. The aqueous phase is separated and discarded. The organic phase is successively washed with water, and aqueous sodium bicarbonate and finally water again, whereupon it is dried over anhydrous sodium sulfate and stripped of solvent by distillation. The residue, recrystallized from acetone, affords pure 17α - (2 - carboxyethyl)-6β-chloroandrostane-3β,5α, 17β-triol γ-lactone, which melts at approximately 189–190° (with decomposition).

B. 17α - (2 - carboxyethyl) - 6β - chloro-5α,17β-dihydroxyandrostan-3-one γ-lactone.—Using the technique of Example 1C, but substituting 87 parts of 17α-(2-carboxyethyl)-6β-chloroandrostane-3β,5α,17β-triol γ-lactone for the 17α-(2-carboxyethyl)-6β-fluoroandrostane-3β,5α,17β-triol γ-lactone called for therein, one obtains 17α-(2-carboxyethyl)-6β-chloro-5α,17β-dihydroxyandrostan-3-one γ-lactone.

C. 17α - (2 - carboxyethyl) - 6α - chloro - 17β - hydroxyandrost-4-en-3-one lactone.—Using the technique of Example 1D, but substituting 71 parts of 17α-(2-carboxyethyl)-6β-chloro-5α,17β-dihydroxyandrostan-3-one γ-lactone for the 71 parts of 17α-(2-carboxyethyl)-6β-fluoro-5α,17β-dihydroxyandrostan-3-one γ-lactone called for therein, one obtains 17α-(2-carboxyethyl)-6α-chloro-17β-hydroxyandrost-4-en-3-one lactone, of the formula

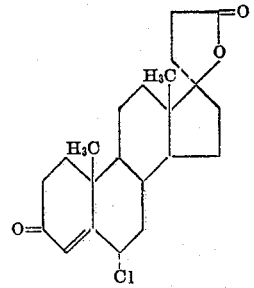

Example 4

17α - (2 - carboxyethyl) - 6β - chloro - 17β - hydroxyandrost-4-en-3-one lactone.—Using the technique of Example 2, but substituting 8 parts of 17α-(2-carboxyethyl)-6β-chloro-5α,17β-dihydroxyandrostan-3-one γ-lactone for the 8 parts of 17α-(2-carboxyethyl)-6β-fluoro-5α,17β-dihydroxyandrostan-3-one γ-lactone called for therein, one obtains 17α-(2-carboxyethyl)-6β-chloro-17β-hydroxyandrost-4-en-3-one lactone, of the formula

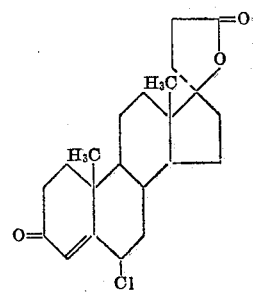

Example 5

6β - bromo - 17α - (2 - carboxyethyl) - 17β - hydroxyandrost-4-en-3-one lactone.—To 34 parts of 17α-(2-carboxyethyl)-17β-hydroxyandrost-4-en-3-one lactone dissolved in 1600 parts of warm carbon tetrachloride is added, with agitation, 18 parts of N-bromosuccinimide. An exothermic effect produces gentle boiling which is sustained for one hour by heating with continued agitation under reflux. The reaction mixture is then cooled to room temperature and filtered. The filtrate is freed of solvent by vacuum distillation, leaving an oily residue which solidifies on trituration with hexane. Recrystallization from a mixture of acetone and hexane affords pure 6β - bromo - 17α - (2 - carboxyethyl) - 17β - hydroxyandrost-4-en-3-one lactone, which melts in the range 143.5–148° (with decomposition). The product has the formula

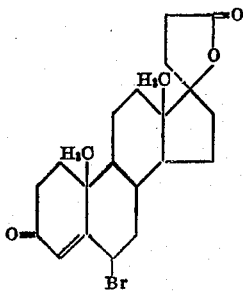

What is claimed is:
1. A compound of the formula

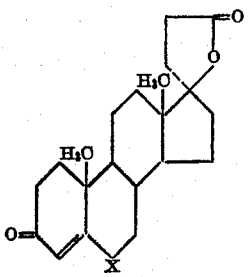

wherein X denotes replacement of one of the hydrogens on carbon atom 6 with halogen.

2. A compound of the formula

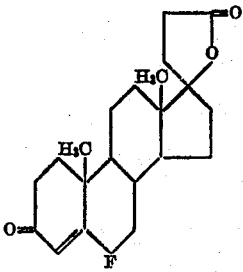

wherein F denotes replacement of one of the hydrogens on carbon atom 6 with fluorine.

3. 17α - (2 - carboxyethyl)-6α-fluoro-17β-hydroxyandrost-4-en-3-one lactone.

4. 17α - (2 - carboxyethyl)-6β-fluoro-17β-hydroxyandrost-4-en-3-one lactone.

5. As an intermediate, 17α-(2-carboxyethyl)-6β-fluoro-5α,17β-dihydroxyandrostan-3-one γ-lactone.

6. A compound of the formula

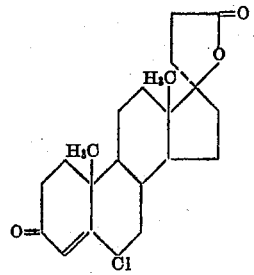

wherein Cl denotes replacement of one of the hydrogens on carbon atom 6 with chlorine.

7. 17α - (2 - carboxyethyl)-6α-chloro-17β-hydroxyandrost-4-en-3-one lactone.

8. As an intermediate, 17α-(2-carboxyethyl)-6β-chloroandrostane-3β,5α,17β-triol γ-lactone.

9. A compound of the formula

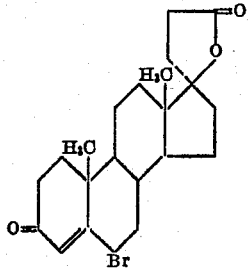

wherein Br denotes replacement of one of the hydrogens on carbon atom 6 with bromine.

10. 6β - bromo-17α-(2 - carboxyethyl)-17β-hydroxyandrost-4-en-3-one lactone.

References Cited in the file of this patent

Fried et al.: J.A.C.S., vol. 76, pages 1455–6 (1954).
Bowers et al.: J.A.C.S., vol. 80, pages 4423–4 (1958).
Hogg et al.: Chem. and Ind., pages 1002–3, August 9, 1958.